United States Patent [19]
Pille-Wolf et al.

[11] Patent Number: 5,340,852
[45] Date of Patent: Aug. 23, 1994

[54] POLYISOCYANATE COMPOSITION

[75] Inventors: Wolfgang Pille-Wolf, Sint-Agatha-Rode; Jan W. Leenslag, Tremelo; Berend Eling, Bertem; Dirk G. C. Ingelaere, Poperinge, all of Belgium

[73] Assignee: Imperial Chemical Industries PLC, London, England

[21] Appl. No.: 119,266

[22] Filed: Sep. 9, 1993

[51] Int. Cl.$^5$ .............................................. C08L 75/04
[52] U.S. Cl. ........................................ 524/14; 524/35; 524/73; 528/55; 528/56; 528/58; 252/182.2; 427/340; 427/394; 427/385.5
[58] Field of Search ................. 54/14, 35, 73; 528/55, 528/56, 58; 252/182.2, 389.9; 427/340, 385.5, 394

[56] References Cited

U.S. PATENT DOCUMENTS

| | | | |
|---|---|---|---|
| 3,870,665 | 3/1975 | Diehr et al. | 260/17.2 |
| 4,490,518 | 12/1984 | Fuzesi et al. | 527/401 |
| 4,608,407 | 8/1986 | Kerimis et al. | 524/14 |

FOREIGN PATENT DOCUMENTS

| | | |
|---|---|---|
| 1073599 | 3/1980 | Canada . |
| 1176778 | 10/1984 | Canada . |
| 2336428 | 7/1977 | France . |

OTHER PUBLICATIONS

Chemical Abstracts, No. 151834n, vol. 95, No. 9 (1981).

*Primary Examiner*—Maurice J. Welsh

[57] ABSTRACT

Compositions are provided which comprise an organic polyisocyanate and at least one compound corresponding to the following general formula (I) or (II)

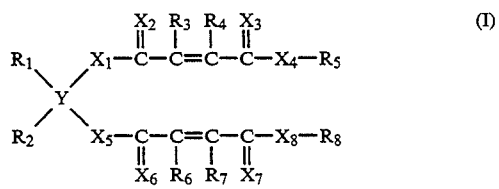

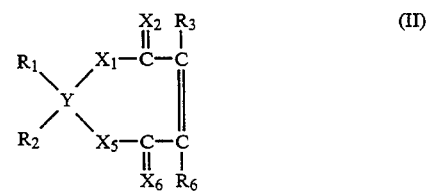

wherein
Y represents Zn, Ni, Co, Cd, Pb, Sn or Cu;
$X_1$, $X_2$, $X_3$, $X_4$, $X_5$, $X_6$, $X_7$, and $X_8$ each independently represents O or S;
$R_1$ and $R_2$ each independently represents a saturated aliphatic hydrocarbon radical having 1 to 20 carbon atoms or an aromatic ring with the proviso that $R_1$ and $R_2$ are only existing if Y is Sn(IV);
$R_3$, $R_4$, $R_6$ and $R_7$ each independently represents hydrogen or a saturated aliphatic hydrocarbon radical having 1 to 20 carbon atoms;
$R_5$ and $R_8$ each independently represents a saturated aliphatic hydrocarbon radical;
with the exception of a polyisocyanate composition comprising dibutyl tin maleate and ammonium salts of the type obtainable by reacting primary, secondary and/or tertiary amines with alkyl esters of acids of phosphorus exerting alkylating properties against the amines.

13 Claims, No Drawings

POLYISOCYANATE COMPOSITION

This invention relates to polyisocyanate compositions and more in particular to polyisocyanate compositions for use in binding lignocellulosic material and to a process for the preparation of lignocellulosic bodies.

The use of organic polyisocyanates as binders for lignocellulosic material in the manufacture of sheets or moulded bodies such as waferboard, chipboard, fibreboard and plywood is well known. In a typical process the organic polyisocyanate, optionally in the form of a solution or an aqueous emulsion, is applied to the lignocellulosic material which is then subjected to heat and pressure.

The high quality of the resulting materials is due, to a very large extent, to the excellent adhesive properties of organic polyisocyanates. At the same time, however, the excellent adhesive properties offered by a polyisocyanate creates an offsetting disadvantage in that it causes severe sticking of the lignocellulosic material to the hot metal surfaces with which it comes into contact during the hot-pressing operation. Most often the product is damaged in removing it from the press and much time is required to remove adhering cellulosic material from the surfaces of the press parts.

In carrying out an efficient commercial process either by a continuous or semi-continuous operation to produce the high quality moulded article offered by the use of polyisocyanates it is mandatory that the press equipment be used repeatedly at short cycle times to produce articles having uniform quality. Therefore, the problems associated with adhesion to the press parts must be essentially eliminated. Furthermore, the time required for cleaning the press parts surfaces to remove resinuous material formed on the hot surfaces of the press parts due to thermal decomposition must be reduced to a minimum.

Several attempts have been made to overcome this adhesion problem but no completely satisfactory solution has been found up till now.

A technique that has been used in the manufacture of waferboard is to provide a core of isocyanate treated wood chips with outer layers of chips separately treated with a formaldehyde condensate adhesive resin. The adhesion problem is reduced in this way but the quality of the product is less satisfactory.

The use of release papers has also been tried but causes process difficulties and adds to costs.

Conventional release agents such as oils, wax polishes, metallic soaps, silicones and polytetrafluoroethylene have been applied externally on the metal surfaces but have proved unsatisfactory. Further it is not practicable to apply a release agent to the mould surface or surfaces, for instance, in the manufacture of composite sheets. The boards are made near continuously so that there is limited access to the platens making the application of external release agents to the platens themselves practically impossible.

Another approach is to apply a release agent internally with the polyisocyanate. Apart from providing satisfactory release the polyisocyanate compositions containing internal release agents should be storage stable for at least some weeks.

In Canadian patent no. 1176778 is described the addition of metal salts of higher fatty acids such as zinc stearate to the polyisocyanate binding composition. However release of the boards from the press plates is not satisfactory without a supplemental external release agent being applied simultaneously. Further the storage stability of the polyisocyanate composition containing the zinc stearate internal release agent is poor.

In U.S. Pat. No. 3,870,665 the use of polyisocyanates in conjunction with compounds which catalyse the formation of isocyanurate from isocyanates as mold release agents is described. Among the many types of such catalytic compounds mentioned are certain metal salts of carboxylic acids (such as lead octoate) and Mannich bases of condensable phenols, the latter types being preferred. It is also described as advantageous to use the isocyanurate catalysts in combination with materials which are not alone capable of polymerising isocyanates to a significant extent; dibutyltin dilaurate is mentioned as such a material. In addition to not providing a sufficient release the polyisocyanate compositions described in U.S. Pat. No. 3,870,665 are not storage stable.

It is an object of the present invention to provide a polyisocyanate composition that is storage stable and that yields satisfactory release of the lignocellulosic bodies bound with said composition from the metal press surfaces.

The present invention provides a polyisocyanate composition comprising at least one compound corresponding to the following general formula (I) or (II)

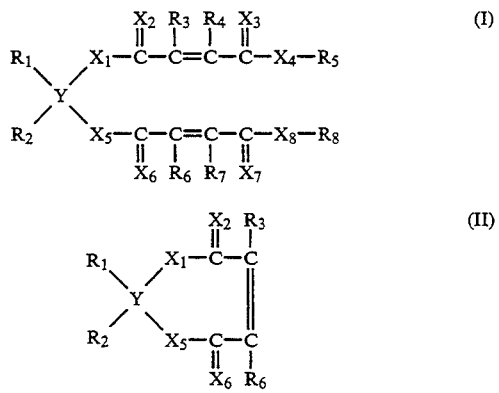

wherein
Y represents Zn, Ni, Co, Cd, Pb, Sn or Cu;
$X_1$, $X_2$, $X_3$, $X_4$, $X_5$, $X_6$, $X_7$ and $X_8$ each independently represents O or S;
$R_1$ and $R_2$ each independently represents a saturated aliphatic hydrocarbon radical having 1 to 20 carbon atoms or an aromatic ring with the proviso that $R_1$ and $R_2$ are only existing if Y is Sn(IV);
$R_3$, $R_4$, $R_6$ and $R_7$ each independently represents hydrogen or a saturated aliphatic hydrocarbon radical having 1 to 20 carbon atoms;
$R_5$ and $R_8$ each independently represents a saturated aliphatic hydrocarbon radical;
with the exception of a polyisocyanate composition comprising dibutyl tin maleate and ammonium salts of the type obtainable by reacting primary, secondary and/or tertiary amines with alkyl esters of acids of phosphorus exerting alkylating properties against the amines.

Polyisocyanate compositions according to the present invention are extremely effective in minimising unwanted adhesion to caul plates, press plates and other surfaces with which the treated lignocellulosic material may come into contact. Further these polyisocyanate compositions are stable for at least two weeks.

Polyisocyanate compositions comprising dibutyl tin maleate and ammonium salts of the type obtainable by reacting primary, secondary and/or tertiary amines with alkyl esters of acids of phosphorus exerting alkylating properties against the amines are described in U.S. Pat. No. 4,608,407. The latter patent describes the use of these compositions in binding lignocellulosic material not to improve the release from the press platens but to shorten the molding times without any undesirable reactions occuring at room temperature or during mixing and storage.

The term "saturated aliphatic hydrocarbon radical" as used herein is meant to include straight and branched chain alkyl radicals, cycloalkyl radicals and oxyalkylated alkyl or cycloalkyl radicals.

Preferably $X_1$ to $X_8$ all represent O and Y represents Sn (IV) or Zn and most preferably Sn (IV). In terms of storage stability the best results are obtained with the zinc compounds; in terms of release the best results are obtained with the tin compounds.

Preferably $R_3$, $R_4$, $R_6$ and $R_7$ all represent hydrogen and $R_1$, $R_2$, $R_5$ and $R_8$ independently represent an alkyl chain having 1 to 8 carbon atoms such as methyl, ethyl, propyl, butyl, hexyl, octyl and isomers thereof. Most preference is given to butyl, octyl and hexyl. Other preferred compounds are those wherein $R_5$ and/or $R_8$ represent $-((CH_2)_m-O)_n-R_9$ wherein $R_9$ is an alkyl radical (preferably butyl), n is an integer of from 1 to 10 (preferably 1 to 6 and most preferably 3) and m is an integer of from 2 to 3.

Preferred compounds corresponding to general formula (I) or (II) above are Stanclere T-55, T-57 and T-81 available from Akzo.

The present polyisocyanate composition may contain only one compound corresponding to general formula (I) or (II) or may contain two or more different compounds corresponding to general formula (I) or (II).

The compounds according to general formula (I) or (II) above can be prepared by methods known in the art, like for example for the tin compounds by the reaction of a dialkyltin dihalogenide with alkali salts of carboxylic acids.

The polyisocyanates for use in the composition of the present invention may be any organic polyisocyanate compound or mixture of organic polyisocyanate compounds, provided said compounds have at least 2 isocyanate groups. Organic polyisocyanates include diisocyanates, particularly aromatic diisocyanates, and isocyanates of higher functionality.

Examples of organic polyisocyanates which may be used in the present invention include aliphatic isocyanates such as hexamethylene diisocyanate; and aromatic isocyanates such as m- and p-phenylene diisocyanate, tolylene-2,4- and -2,6-diisocyanate, diphenylmethane-4,4'-diisocyanate, chlorophenylene-2,4-diisocyanate, naphthylene-1,5-diisocyanate, diphenylene-4,4'-diisocyanate, 4,4'-diisocyanate-3,3'-dimethyldiphenyl, 3-methyldiphenylmethane-4,4'-diisocyanate and diphenyl ether diisocyanate; and cycloaliphatic diisocyanates such as cyclohexane-2,4- and -2,3-diisocyanate, 1-methylcyclohexyl-2,4- and -2,6-diisocyanate and mixtures thereof and bis-(isocyanatocyclohexyl)methane and triisocyanates such as 2,4,6-triisocyanatotoluene and 2,4,4-triisocyanatodiphenylether.

Modified polyisocyanates containing isocyanurate, carbodiimide or uretonimine groups may be employed as well. Further blocked polyisocyanates, like the reaction product of a phenol or an oxime and a polyisocyanate, may be used, having a deblocking temperature below the temperature applied when using the polyisocyanate composition.

The organic polyisocyanate may also be an isocyanate-ended prepolymer made by reacting an excess of a diisocyanate or higher functionality polyisocyanate with a polyol.

Water-emulsifiable organic polyisocyanates like those described in UK patent no. 1444933, in European patent publication no. 516361 and in PCT patent publication no. 91/03082 can also be used.

Mixtures of isocyanates may be used, for example a mixture of tolylene diisocyanate isomers such as the commercially available mixtures of 2,4- and 2,6-isomers and also the mixture of di- and higher polyisocyanates produced by phosgenation of aniline/formaldehyde condensates.

Such mixtures are well-known in the art and include the crude phosgenation products containing methylene bridged polyphenyl polyisocyanates, including diisocyanate, triisocyanate and higher polyisocyanates together with any phosgenation by-products.

Preferred isocyanates to be used in the present invention are those wherein the isocyanate is an aromatic diisocyanate or polyisocyanate of higher functionality such as a pure diphenylmethane diisocyanate or mixture of methylene bridged polyphenyl polyisocyanates containing diisocyanates, triisocyanates and higher functionality polyisocyanates.

Methylene bridged polyphenyl polyisocyanates are well known in the art. They are prepared by phosgenation of corresponding mixtures of polyamines obtained by condensation of aniline and formaldehyde. For convenience, polymeric mixtures of methylene bridged polyphenyl polyisocyanates containing diisocyanate, triisocyanate and higher functionality polyisocyanates are referred to hereinafter as polymeric MDI.

Preferably the polyisocyanate is liquid at room temperature.

The polyisocyanate composition of the present invention generally contains the compound corresponding to general formula (I) or (II) in amounts ranging from 0.005 to 10 parts by weight, preferably 0.01 to 10 parts by weight, more preferably 0.1 to 10 parts by weight, even more preferably 0.5 to 7 parts by weight and most preferably 0.75 and 5 parts by weight per 100 parts by weight of polyisocyanate.

In the case of Y being Sn(IV) the amount of the compound corresponding to general formula (I) or (II) is preferably between 0.75 and 1.25 parts by weight per 100 parts by weight of polyisocyanate. In the case of Y being Zn the amount of the compound corresponding to general formula (I) or (II) is preferably about 5 parts by weight per 100 parts by weight of polyisocyanate.

In order to further improve the storage stability of the polyisocyanate composition of the present invention an inert diluent may be added to the composition. Suitable diluents include plasticizers of the type mentioned in "Taschenbuch der Kunststoff-Additive", Ed. by R. Gachter and H. Muller, Carl Hanser Verlag Munchen, third edition, 1989. Preferred diluents are phtalates, aliphatic carboxylates and fatty acid esters. A particularly preferred diluent is Priolube 1403 available from Unichema being a methyl oleate. These diluents are added in amounts of from 0 to 30 parts by weight per 100 parts by weight of polyisocyanate and preferably in amounts of from 5 to 15 parts by weight per 100 parts by weight of polyisocyanate.

In the case of Y being Zn a suitable solvent for the Zn compound may be added such as dimethyl maleate esters.

The composition further may comprise conventional additives like flame retardants, lignocellulosic preserving agents, fungicides, waxes, sizing agents, fillers and other binders like formaldehyde condensate adhesive resins.

The polyisocyanate composition of the present invention is made by simply mixing the organic polyisocyanate, the compound corresponding to general formula (I) or (II) and optionally the inert diluent and/or other additives. Shaking or stirring the reactants may improve the mixing.

The present invention is also concerned with a process for preparing lignocellulosic bodies by bringing lignocellulosic parts into contact with the present polyisocyanate composition and by pressing this combination.

Therefore the present invention also provides a process for binding lignocellulosic material comprising the steps of a) bringing said lignocellulosic material in contact with an organic polyisocyanate and a compound corresponding to general formula (I) or (II) and b) subsequently allowing said material to bind.

The lignocellulosic material may be brought in contact with a polyisocyanate composition containing the compound corresponding to general formula (I) or (II) or alternatively the polyisocyanate and the compound corresponding to general formula (I) or (II) can be applied separately to the lignocellulosic material. When applied separately the compound corresponding to general formula (I) or (II) is dissolved in a suitable solvent such as toluene or dimethylformamide.

From convenience point of view the first method is preferred.

Alternatively the compound corresponding to general formula (I) or (II) can also be applied separately onto the metal surfaces of the press plates.

The lignocellulosic bodies are prepared by bringing the lignocellulosic parts into contact with the polyisocyanate composition like by means of mixing, spraying and/or spreading the composition with/onto the lignocellulosic parts and by pressing the combination of the polyisocyanate composition and the lignocellulosic parts, preferably by hot-pressing, normally at 150° C. to 220° C. and 2 to 6 MPa specific pressure.

Such binding processes are commonly known in the art.

In waferboard manufacture the lignocellulosic material and the polyisocyanate composition may be conveniently mixed by spraying the present polyisocyanate composition on the lignocellulosic material while it is being agitated.

The lignocellulosic material after treatment with the polyisocyanate composition is placed on caul plates made of aluminium or steel which serve to carry the furnish into the press where it is compressed to the desired extent usually at a temperature between 150° C. and 220° C. At the start of a manufacturing run it may be helpful, but not essential, to condition the press plates by spraying their surfaces with an external release agent. The conditioned press may then be used many times in the process of the invention without further treatment.

While the process is particularly suitable for the manufacture of waferboard known extensively as oriented strand board and will be largely used for such manufacture, the process may not be regarded as limited in this respect and can also be used in the manufacture of medium density fiberboard, particle board (also known as chipboard) and plywood.

Thus the lignocellulosic material used can include wood strands, woodchips, wood fibers, shavings, veneers, wood wool, cork, bark, sawdust and like waste products of the wood working industry as well as other materials having a lignocellulosic basis such as paper, bagasse, straw, flax, sisal, hemp, rushes, reeds, rice hulls, husks, grass, nutshells and the like. Additionally, there may be mixed with the lignocellulosic materials other particulate or fibrous materials such as mineral fillers, glass fiber, mica, rubber, textile waste such as plastic fibers and fabrics.

Although the process of the present invention seems particularly suitable for binding lignocellulosic material originating from Aspen wood it also works with lignocellulosic material orginating from other types of wood such as Pine or Spruce.

When the polyisocyanate composition is applied to the lignocellulosic material, the weight ratio of polyisocyanate/lignocellulosic material will vary depending on the bulk density of the lignocellulosic material employed. Therefore, the polyisocyanate compositions may be applied in such amounts to give a weight ratio of polyisocyanate/lignocellulosic material in the range of 0.1:99.9 to 20:80 and preferably in the range of 0.5:99.5 to 7.0:93.

If desired, other conventional binding agents, such as formaldehyde condensate adhesive resins, may be used in conjunction with the polyisocyanate composition.

More detailed descriptions of methods of manufacturing waferboard and similar products based on lignocellulosic material are available in the prior art. The techniques and equipment conventionally used can be adapted for use with the polyisocyanate compositions of the present invention.

The sheets and moulded bodies produced from the polyisocyanate compositions of the present invention have excellent mechanical properties and they may be used in any of the situations where such articles are customarily used.

The claimed polyisocyanate compositions are also useful in the preparation of allophanate-modified polyisocyanates and in the curing of neoprenes and thermoplastic polyurethanes.

The invention is illustrated but not limited by the following examples.

EXAMPLE 1

A polyisocyanate composition was prepared from 100 pbw of polymeric MIDI (Suprasee DNR available from Imperial Chemical Industries), 15 pbw of non-reacting diluent methyloleate (Priolube 1403 available from Unichema) and 1 pbw of dibutyltin di(maleate butyl ester) (Stanclere T-55 available from Akzo) by simple stirring for 10 minutes.

35 g of this mixture was added to 1000 g of air-dry Aspen strands as used in the manufacture of Oriented Strand Boards with a moisture content of 5.5% by air atomised spray application in an horizontal paddle blender.

This composition can be stored for more than one hour before panel manufacture.

On a pre-heated, 2 mm thick, clean, solvent wiped caul platen made from mild carbon steel a mat was formed having dimensions of 180 mm×180 mm by using 132 g of the treated Aspen strands. The mat on the caul platen was transferred to a heatable hydraulic press which was modified in such a way that the upper caul platen was hanging under the top hot press platen. Within 20 seconds the press closed to stops and the mat was compressed to a thickness of 6 mm for 2 minutes at 200° C. with a specific pressure of 5 MPa. After opening the resulting strong panel could be removed without force, with minor spots of wood sticking to the top caul platen.

EXAMPLE 2

A polyisocyanate composition was prepared from 100 pbw of Suprasee DNR, 15 pbw of Priolube 1403 and 5 pbw of a 40% solution of zinc bis(isobutyl maleate) in dimethyl maleate.

35 g of this mixture was added to 1000 g of Aspen strands and panels were made in the same way as described above in example 1. Compression under the conditions stated in example 1 resulted in strong boards which could be removed without force from the caul platen.

EXAMPLE 3

A polyisocyanate composition was prepared from 100 pbw of Suprasee DNR, 15 pbw of Priolube 1403 and 1.25 pbw of Stanclere T-55.

50 g of this mixture was added to 1500 g of face layer chips of 100% softwood as used in the industry with a moisture content of 7% and panels were made in the same way as described above in example 1. Compression under the conditions stated in example 1 resulted in strong boards which could be removed without force from the caul platen.

COMPARATIVE EXAMPLE 4

An emulsion was prepared as described in Canadian patent no. 1176778 consisting of 100 pbw of liquid polyisocyanate (Suprasec DNR available from Imperial Chemical Industries), 100 pbw of paraffin oil, 9.4 pbw of a mixture of emulsifying agents (85% of Span 20 and 15% Tween 60, both available from Imperial Chemical Industries), 16.2 pbw of zinc stearate and 8.5 pbw of water.

35 g of this emulsion was added to 1000 g of Aspen strands as described in example 1 above. 222 g of the treated Aspen strands were formed on a cleaned, solvent wiped pre-heated carbon steel caul platen in a mat of 180 mm×180 mm. The mat on the caul platen was transferred into the hot press as described in example 1 and compressed to stops for 3 minutes at 210° C. to achieve a density of 0.68 kg/m³ and a panel thickness of 11 mm. After the press opened the compressed panel could only be removed with considerable force leaving about 20 to 40% wood failure on the caul.

COMPARATIVE EXAMPLE 5

65 g of liquid polyisocyanate (Suprasec DNR available from Imperial Chemical Industries) was mixed with a solution of 12 g of a phenyl Mannich base (as described in U.S. Pat. No. 4,115,373) and 16 g of dimethylformamide according to the description given in U.S. Pat. No. 3,870,665. The mixture gelled within minutes and was not applicable for spray application.

65 g of liquid polyisocyanate and a solution of the above described phenyl Mannich base in 16 g of dimethylformamide were sprayed separately to 930 g of Aspen strands with a moisture content of 14%. Panels were made as described in example 1 above. The first panel stuck badly, the following board with a target thickness of 19 mm increased its thickness after press opening (spring back).

EXAMPLE 6

A polyisocyanate composition was prepared according to the description given in example 1.

This composition was stored for 4 weeks at 25° C. in a sealed container. Over this period the viscosity raised from initially 120 mPas and a NCO content of 26.3% to 225 mPas and a NCO content of 25.4%.

This stored composition was applied to lignocellulosic material in the same way as described in example 1.

The release of the resulting board after hot pressing according to the conditions described in example 1 was still excellent with no wood failure nor build up on the caul platens.

We claim:
1. Composition comprising an organic polyisocyanate and at least one compound corresponding to the following general formula (I) or (II)

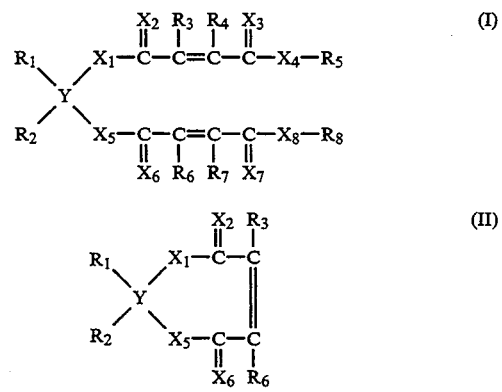

wherein
Y represents Zn, Ni, Co, Cd, Pb, Sn or Cu;
$X_1$, $X_2$, $X_3$, $X_4$, $X_5$, $X_6$, $X_7$ and $X_8$ each independently represents O or S;
$R_1$ and $R_2$ each independently represents a saturated aliphatic hydrocarbon radical having 1 to 20 carbon atoms or an aromatic ring with the proviso that $R_1$ and $R_2$ are only existing if Y is Sn(IV);
$R_3$, $R_4$, $R_6$ and $R_7$ each independently represents hydrogen or a saturated aliphatic hydrocarbon radical having 1 to 20 carbon atoms;
$R_5$ and $R_8$ each independently represents a saturated aliphatic hydrocarbon radical;
with the proviso that said composition excludes a polyisocyanate composition comprising dibutyl tin maleate and ammonium salts of the type obtainable by reacting primary, secondary and/or tertiary amines with alkyl esters of acids of phosphorus exerting alkylating properties against the amines.

2. Composition according to claim 1 wherein $X_1$ to $X_8$ all represent O.

3. Composition according to claim 1 wherein Y represents Sn (IV) or Zn.

4. Composition according to claim 1 wherein $R_3$, $R_4$, $R_6$ and $R_7$ all represent hydrogen and $R_1$, $R_2$, $R_5$ and $R_8$ independently represent an alkyl chain having 1 to 8 carbon atoms.

5. Composition according to claim 4 wherein $R_1$, $R_2$, $R_5$ and $R_8$ independently represent butyl, hexyl or octyl.

6. Composition according to claim 1 wherein the organic polyisocyanate is a polymeric mixture of methylene bridged polyphenyl polyisocyanates.

7. Composition according to any claim 1 wherein the amount of the compound corresponding to general formula (I) or (II) ranges from 0.005 to 10 parts by weight per 100 parts by weight of polyisocyanate.

8. Composition according to claim 7 wherein the amount of the compound corresponding to general formula (I) or (II) ranges from 0.75 to 5 parts by weight per 100 parts by weight of polyisocyanate.

9. Composition according to claim 1 wherein the composition further contains an inert diluent.

10. Composition according to claim 9 wherein said inert diluent is a fatty acid ester added in an amount ranging from 5 to 15 parts by weight per 100 pbw of polyisocyanate.

11. Process for binding lignocellulosic material comprising the steps of
   a) bringing said lignocellulosic material in contact with a polyisocyanate composition and
   b) subsequently allowing said material to bind, characterised in that the polyisocyanate composition is a composition as defined in claim 1.

12. Process for binding lignocellulosic material comprising the steps of
   a) bringing said lignocellulosic material in contact with a polyisocyanate composition and
   b) subsequently allowing said material to bind, characterised in that separately from the polyisocyanate composition said lignocellulosic material is brought in contact with a composition containing at least one compound corresponding to the following general formula (I) or (II)

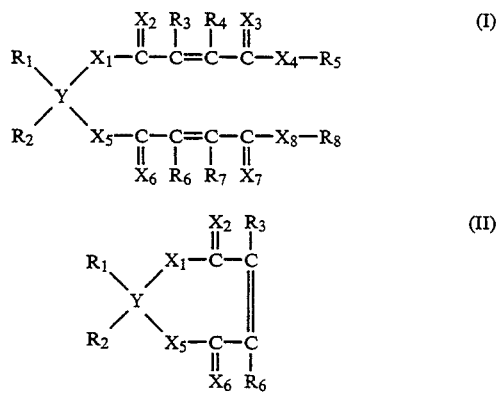

wherein

Y represents Zn, Ni, Co, Cd, Pb, Sn or Cu;

$X_1$, $X_2$, $X_3$, $X_4$, $X_5$, $X_6$, $X_7$ and $X_8$ each independently represents O or S;

$R_1$ and $R_2$ each independently represents a saturated aliphatic hydrocarbon radical having 1 to 20 carbon atoms or an aromatic ring with the proviso that $R_1$ and $R_2$ are only existing if Y is Sn(IV);

$R_3$, $R_4$, $R_6$ and $R_7$ each independently represents hydrogen or a saturated aliphatic hydrocarbon radical having 1 to 20 carbon atoms;

$R_5$ and $R_8$ each independently represents a saturated aliphatic hydrocarbon radical;

with the proviso that said composition excludes a composition comprising dibutyl tin maleate and ammonium salts of the type obtainable by reacting primary, secondary and/or tertiary amines with alkyl esters of acids of phosphorus exerting alkylating properties against the amines.

13. Process according to claim 11 wherein step b) involves hot-pressing the combination of the lignocellulosic material and the polyisocyanate composition.

* * * * *